US006805359B2

(12) United States Patent
Neuhaus et al.

(10) Patent No.: US 6,805,359 B2
(45) Date of Patent: Oct. 19, 2004

(54) EXPANSION RING ASSEMBLY

(75) Inventors: Ronald W. Neuhaus, Fort Wayne, IN (US); James W. Skinner, Fort Wayne, IN (US); Michael R. Miller, Churubusco, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 0 days.

(21) Appl. No.: 10/280,917

(22) Filed: Oct. 25, 2002

(65) Prior Publication Data

US 2004/0080118 A1 Apr. 29, 2004

(51) Int. Cl.⁷ .............................................. F16L 17/00
(52) U.S. Cl. ........................ 277/576; 277/616; 285/237
(58) Field of Search ................................ 285/236, 237, 285/230, 421; 277/602, 607, 606

(56) References Cited

U.S. PATENT DOCUMENTS

| 4,097,171 A | 6/1978 | Fier ............................. 404/26 |
| 4,281,944 A | 8/1981 | Bowman ...................... 404/26 |
| 4,469,467 A | 9/1984 | Odill et al. .................... 404/25 |
| 4,872,780 A | 10/1989 | Bowman ...................... 404/26 |
| 4,927,290 A | 5/1990 | Bowman ...................... 404/26 |
| 5,044,822 A | 9/1991 | Moss ........................... 404/52 |
| RE34,550 E | 2/1994 | Bowman ...................... 404/26 |
| 5,316,407 A | 5/1994 | Miller .......................... 404/25 |
| 5,431,459 A | 7/1995 | Gundy ........................ 285/237 |
| 5,474,396 A | 12/1995 | Bravo .......................... 404/26 |
| 5,496,128 A | 3/1996 | Odill ............................ 404/25 |
| 5,529,312 A | 6/1996 | Skinner et al. .............. 277/9.5 |
| 5,732,955 A | 3/1998 | Skinner et al. ............. 277/101 |
| 5,876,039 A | 3/1999 | Skinner et al. ............. 277/617 |
| 5,954,344 A | 9/1999 | Miller ......................... 277/616 |
| 2002/0104208 A1 | 8/2002 | Kurdziel et al. ............. 29/235 |
| 2002/0153668 A1 | 10/2002 | Deeb et al. ................. 277/606 |

FOREIGN PATENT DOCUMENTS

JP            2769111        10/1998

OTHER PUBLICATIONS

"Tech–Data", Cretex Specialty Products, Aug., 1995.
"Watertight Storm Sewers Save Money", Press–Seal Gasket Corporation.
"Flexible Connectors in Storm Sewers Save Money for Vermont Towns", reprinted from PublicWorks, Jul. 1999.

*Primary Examiner*—Alison Pickard
*Assistant Examiner*—Enoch Peavey
(74) *Attorney, Agent, or Firm*—Baker & Daniels

(57) ABSTRACT

An expansion ring assembly for sealing a gasket with respect to an annular wall of a rigid structure. The expansion ring assembly includes a drive mechanism for engaging and driving apart the opposing ends of an expansion ring to thereby radially expand the ring. The drive mechanism generally includes a pair of block members having threaded bores therethrough, and a bolt having oppositely-threaded ends which are threaded within respective threaded bores of the block members. The bolt additionally includes tool-receiving structure, such as a nut portion, which may be engaged by a suitable tool to rotate the bolt. The block members are respectively engaged with opposite ends of the expansion ring. Rotation of the bolt in a first direction simultaneously drives the block members apart from one another along the bolt to radially expand the expansion ring, and rotation of the bolt in a an opposite, second direction simultaneously drives the block members toward one another along the bolt to allow the expansion ring to radially contract.

33 Claims, 18 Drawing Sheets

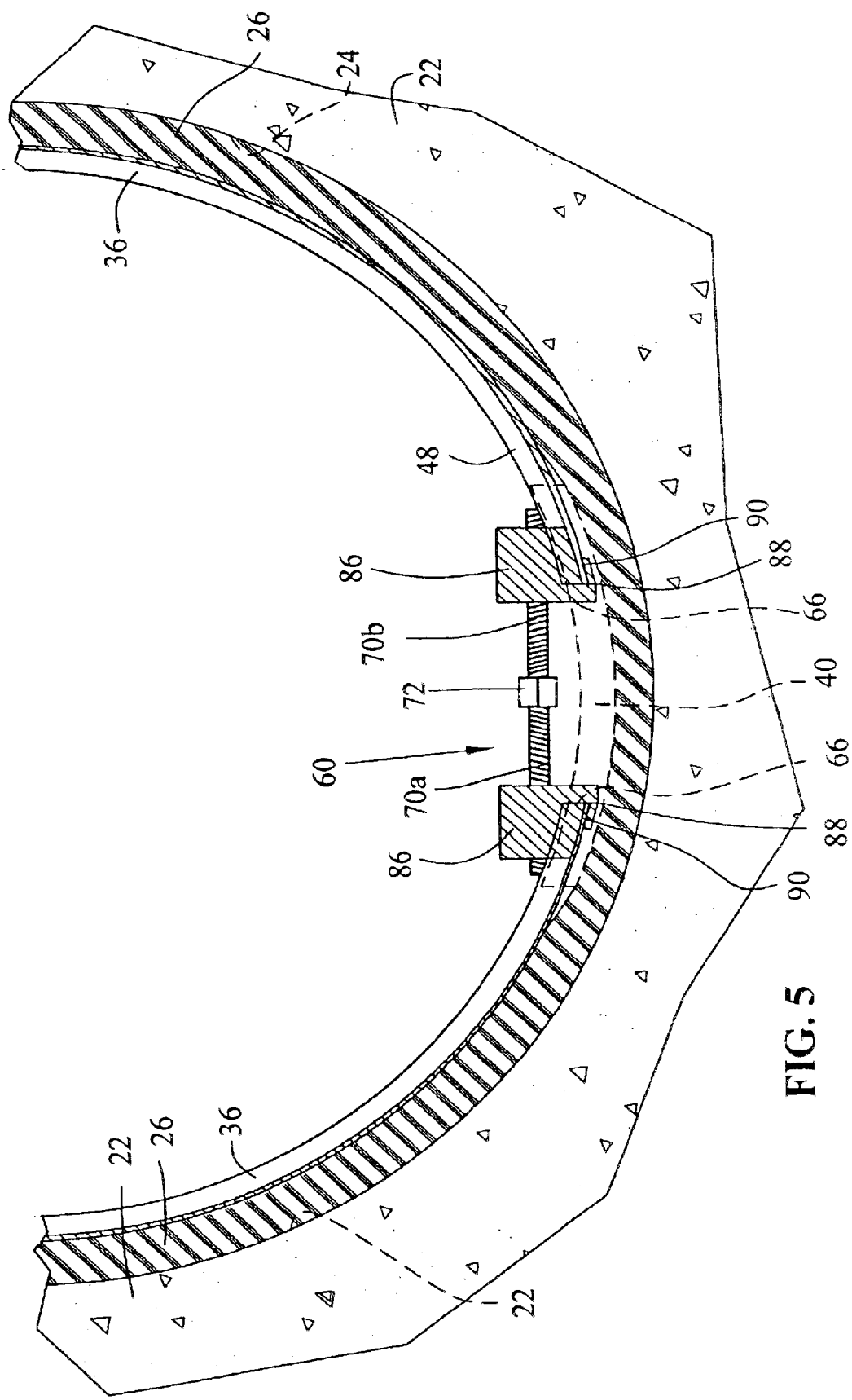

EXPANSION RING ASSEMBLY

BACKGROUND OF THE INVENTION

1. Field of the Invention

The present invention relates to an expandable seal arrangement, and associated method, for sealing a gasket to an annular wall of a rigid structure.

2. Description of the Related Art

In underground pipe systems, it is often necessary to connect a pipe in a sealed manner within an opening in the wall of a rigid structure, such as a manhole riser or monolithic base, for example. Typically, a flexible elastomeric gasket is placed within the opening in the wall, followed by fitting an expansion ring against the interior surface of the gasket. Thereafter, a suitable expansion mechanism is used to radially expand the expansion ring and lock same in an expanded condition in which the gasket is sealingly compressed between the expansion ring and the opening in the wall of the structure. Thereafter, a pipe is inserted through the gasket, and one or more clamps are installed around a portion of the gasket which extends from the wall to sealingly compress the extending portion of the gasket between the clamps and the outer surface of the pipe. In this manner, a sealed connection is made between the pipe and the structure.

One known expansion ring includes a ratcheting engagement between overlapping ends of the ring. When the ends of the ring are forced in opposite directions from one another as the ring is radially expanded, ratchet teeth on the ring ends sequentially engage one another, wherein the expansion ring may be sequentially expanded in an incremental manner into multiple locked positions. A separate tool is used to engage the opposite ends of the expansion ring and to drive same apart from one another. Typically, such tools can be expensive, as same are specialized and designed for specific use only with a particular corresponding configuration of the expansion ring.

Although the foregoing expansion rings are effective, the expansion rings may only be expanded in designated increments which may not correspond to an ideal diameter of the expansion ring which is the most effective to sealingly compress the gasket between the expansion ring and an opening in the wall of the structure. For example, a suitable tool may be used to expand the expansion ring to an expanded, locked position in which the gasket is not compressed to its fullest extent between the expansion ring and the opening, yet further expansion of the expansion ring may not be possible because the gasket cannot be further compressed sufficiently to allow for expansion of the expansion ring to the next locked position.

What is needed is an expansion ring mechanism which is an improvement over the foregoing.

SUMMARY OF THE INVENTION

The present invention provides an expansion ring assembly for sealing a gasket with respect to an annular wall of a rigid structure. The expansion ring assembly includes a drive mechanism for engaging and driving apart the opposing ends of an expansion ring to thereby radially expand the ring. The drive mechanism generally includes a pair of block members having threaded bores therethrough, and a bolt having oppositely-threaded ends which are threaded within respective bores of the block members. The bolt additionally includes tool-receiving structure, such as a nut portion, which may be engaged by a suitable tool to rotate the bolt. The block members are respectively engaged with opposite ends of the expansion ring. Rotation of the bolt in a first direction simultaneously drives the block members apart from one another along the bolt to radially expand the expansion ring, and rotation of the bolt in a an opposite, second direction simultaneously drives the block members toward one another along the bolt to allow the expansion ring to radially contract.

Expansion of the expansion ring compresses the gasket between the expansion ring and the opening of the structure to provide a fluid tight seal between the gasket and the structure. Subsequently, a pipe may be inserted through a second portion of the gasket which extends outwardly of the structure, followed by securing the extending portion of the gasket to the outer surface of the pipe using conventional hose clamps or take-up claims, for example.

The present expansion ring assembly may be used in other applications, such as, for example, sealing a gasket about the interface between a manhole base and a manhole frame to prevent water infiltration into a manhole, or for sealing an internal coupling gasket within one or more pipes to prevent water infiltration into a pipeline.

Advantageously, the oppositely-threaded ends of the bolt allow rotation of the bolt in one direction to simultaneously drive the block members apart from each other to expand the expansion ring, such that only one tool need be used to actuate the drive mechanism to expand the expansion ring. Additionally, the screw threaded engagement between the bolt and the block members allows the block members to be driven away from one another along the bolt to an infinitely variable extent based upon the rotational position of the bolt. Therefore, the expansion ring may be expanded to a precise point wherein the gasket is firmly and sufficiently compressed between the expansion ring and the opening of the structure to provide a fluid tight seal.

The expansion ring may also be further expanded after initial installation, if needed, to tighten the seal of the gasket by simply engaging a tool with the bolt of the drive mechanism and rotating same to drive the block members apart from one another to further expand the expansion ring. A further advantage of the expansion ring assembly is the ability to remove the assembly from the structure if needed, followed by re-installing the assembly in a different position, or by re-using the assembly by installing same in a different structure or using same in a different application.

Additionally, a plurality of specially configured wrenches are provided, which include socket ends having a varying angular orientation, allowing a suitable socket end to be engaged with the nut portion of the bolt of the drive mechanism when the drive mechanism is in a small clearance space, regardless of the rotational position of the nut portion. Further, a wrench is provided which includes a socket end having an internal notch which facilitates ratcheting movement of the socket end of the wrench with respect to the nut portion of the bolt, thereby allowing rotation of the bolt without complete removal of the wrench from the bolt between wrench turns. The wrench may be configured with a pair of plates attached to the sides of the socket end of the wrench, which engage the sides of the nut portion to prevent the socket end from slipping off of the nut portion as the nut portion is rotated.

In one form thereof, the present invention provides an expansion ring assembly for sealing a gasket to an annular wall, including a ring defining a pair of end portions; and a drive mechanism, including a pair of block members each having a threaded bore therethrough, the block members removably engaged with respective end portions of the ring; and a bolt including oppositely-threaded ends respectively threaded within the bores of the block members, wherein rotation of the bolt in a first direction causes the block members to be simultaneously driven apart from one another to thereby expand the ring.

In another form thereof, the present invention provides, in combination, a structure having an annular wall; a flexible, substantially annular gasket received within the annular wall; and an expansion ring assembly received within the gasket, the expansion ring assembly including a ring defining a pair of end portions; and a drive mechanism including a pair of block members each having a threaded bore therethrough, the block members respectively engaging the end portions of the ring, and a bolt including oppositely-threaded ends respectively threaded within the bores of the block members, wherein rotation of the bolt in a first direction causes the block members to be simultaneously driven away from one another to thereby expand the ring and compress the gasket into sealing engagement with the annular wall.

In another form thereof, the present invention provides an expansion ring assembly in combination with a gasket for outwardly radially compressing the gasket into sealing engagement with an annular wall, including a ring defined by at least two segments, each segment having a pair of opposite end portions; and at least two drive mechanisms, each drive mechanism including a pair of block members each having a threaded bore therethrough, the block members respectively associated with adjacent end portions of the ring segments; and a bolt including oppositely-threaded ends respectively threaded within the bores of the block members, wherein rotation of the bolt in a first direction causes the block members to be driven away from one another to thereby expand the ring.

In a still further form thereof, the present invention provides a method of sealingly connecting a gasket to an annular wall, including the steps of placing a gasket within the annular wall; fitting an expansion ring against an interior surface of the gasket; engaging a tool with a bolt of a drive mechanism, the bolt including oppositely-threaded ends threadably engaged with block members associated with opposing ends of the expansion ring; and rotating the bolt with the tool to simultaneously drive the block members apart from one another to expand the expansion ring and sealingly compress the gasket between the expansion ring and the annular wall.

In a still further form thereof, the present invention provides a wrench for use in engaging a nut, including a shank having an open socket end profile with at least two surfaces configured to engage corresponding surfaces of the nut; and a pair of side portions which project beyond the open socket end profile, wherein when the wrench is engaged with the nut, the side portions prevent lateral separation of said wrench from the nut.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 5 is a fragmentary elevational view of a gasket within an opening in the wall of a concrete structure, showing an expansion ring assembly according to an additional alternative embodiment;

Corresponding reference characters indicate corresponding parts throughout the several views. The exemplifications set out herein illustrate preferred embodiments of the invention, and such exemplifications are not to be construed as limiting the scope of the invention any manner.

DETAILED DESCRIPTION

Figure 1A:
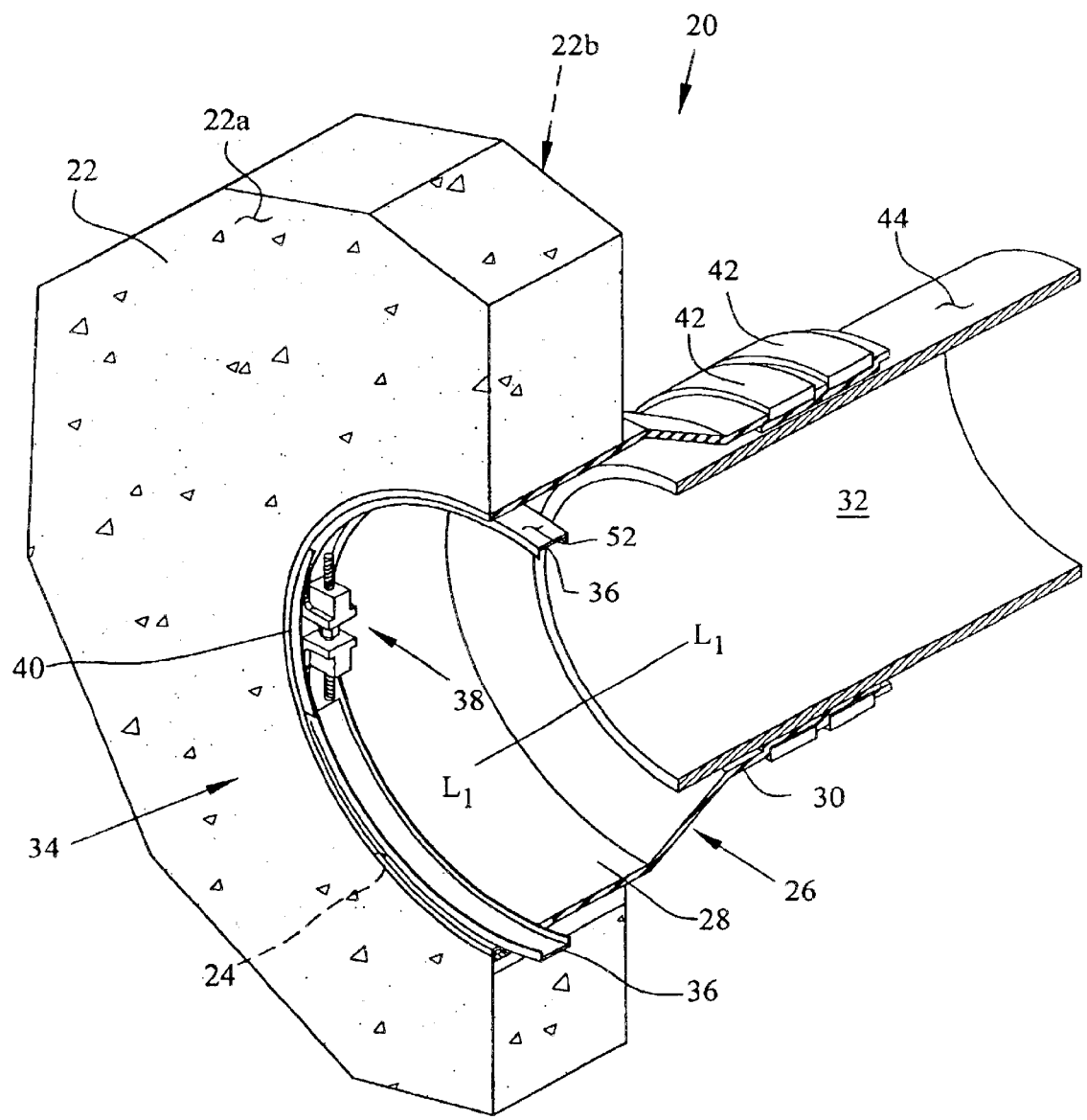
FIG. 1A is a partial sectional view of a connection between a concrete structure and a pipe, wherein a wall of the concrete structure includes an opening into which a gasket is sealingly fitted with an expansion ring assembly according to the present invention, and further showing a pipe sealingly connected to the gasket.

Referring to FIG. 1A, pipe connection 20 in an underground pipe system is shown, in which a pipe is connected to a structure, such as a manhole riser or monolithic base, for example. The structure may be formed of concrete, fiberglass, or any other suitable rigid material. The structure includes wall 22 having interior side 22a defining the interior of the structure, and exterior side 22b defining the exterior of the structure. Additionally, wall includes opening 24 therein. An annular gasket 26 includes a first portion 28 disposed within opening 24 of wall 22, and a second portion 30 extending from first portion 28. Gasket 26 may be made from a flexible, elastomeric material such as rubber or neoprene, for example, and provides a sealing connection between opening 24 in wall 22 of the structure and a pipe 32. First portion 28 of gasket 26 is sealingly engaged with opening 24 of wall 22 by expansion ring assembly 34, which generally includes expansion ring 36, drive mechanism 38, and oversleeve 40. As discussed in detail below, expansion ring assembly 34 is radially expandable to compress gasket 26 into sealing engagement with opening 24 in wall 22 to provide a fluid tight seal therebetween.

After first portion 28 of gasket 26 is sealingly engaged with opening 24 of wall 22 by expansion ring assembly 34, second portion 30 of gasket 26 is connected to pipe 32 by inserting pipe 32 therethrough, followed by installing one or more clamps 42 around second portion 30 of gasket 26 and tightening clamps 42 to compress second portion 28 of gasket 26 into sealing engagement with outer surface 44 of pipe 32 to provide a fluid tight seal therebetween. Second portion 30 of gasket 26 may include annular recessed seats 46 for receipt of clamps 42 to locate clamps 42 on second portion 30 of gasket 26.

In FIG. 1A, only a portion of the length of pipe 32 is shown for clarity, it being understood that pipe 32 typically extends past expansion ring assembly 34 through opening 24 in wall 22, past inner surface 22a of wall 22, and into the interior of the structure. Also, expansion ring assembly 34 is shown in FIG. 1A with drive mechanism 38 disposed in a nine o'clock position with respect to opening 24 for clarity. However, expansion assembly 34 may be selectively configured with drive mechanism 38 oriented in any desired position around the circumference of opening 24, it being noted that a configuration with drive mechanism 38 disposed in a twelve o'clock position is favored in many applications. Further, the pipe connection of FIG. 1A may installed in a manner in which second portion 30 of gasket 26 extends inward of wall 22, in essentially the opposite manner shown in FIG. 1A, such that clamps 42 are disposed within the structure.

Figure 1B:
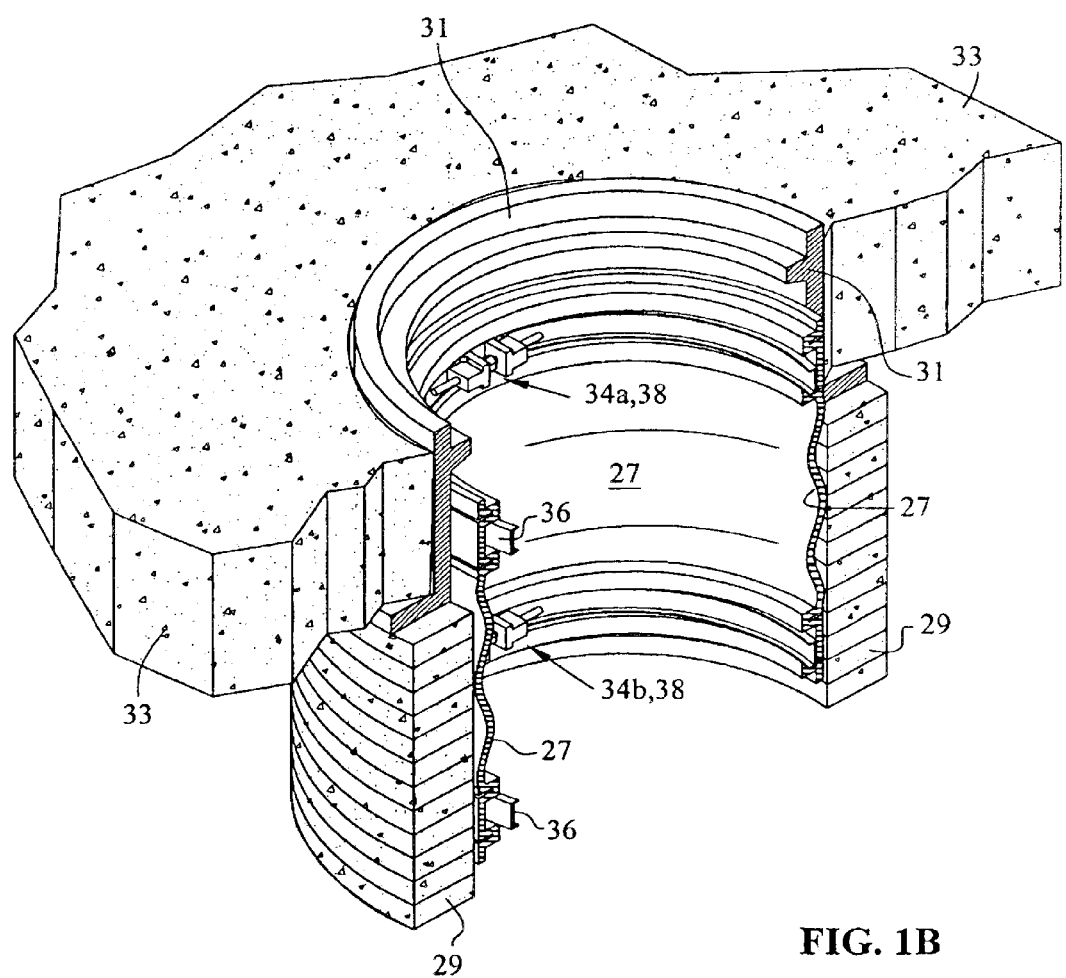
FIG. 1B is a partial sectional view of a connection between a manhole frame and a manhole base disposed beneath a pavement surface, showing a gasket sealingly connecting the manhole base and the manhole frame using a pair of expansion ring assemblies according to the present invention to prevent water infiltration into the manhole.

Although expansion ring assembly 34 is shown in FIG. 1A in an application in which expansion ring assembly 34 is used to seal a gasket within an opening in the wall of a structure, expansion ring assembly 34 may also be used in many other applications. For example, in FIG. 1B, a pair of expansion ring assemblies 34a and 34b are used to seal gasket 27 about an interface between manhole base 29 and a manhole frame 31 disposed beneath pavement surface 33. Specifically, an upper expansion ring assembly 34a is used to press an upper portion of gasket 27 into sealing engagement with manhole frame 31, and a lower expansion ring assembly 34b is used to press a lower portion of gasket 27 into sealing engagement with manhole base 29. In this manner, water infiltration into manhole base 29 is prevented, regardless of whether relative movement occurs between manhole frame 31 and manhole base 29.

Figure 1C:
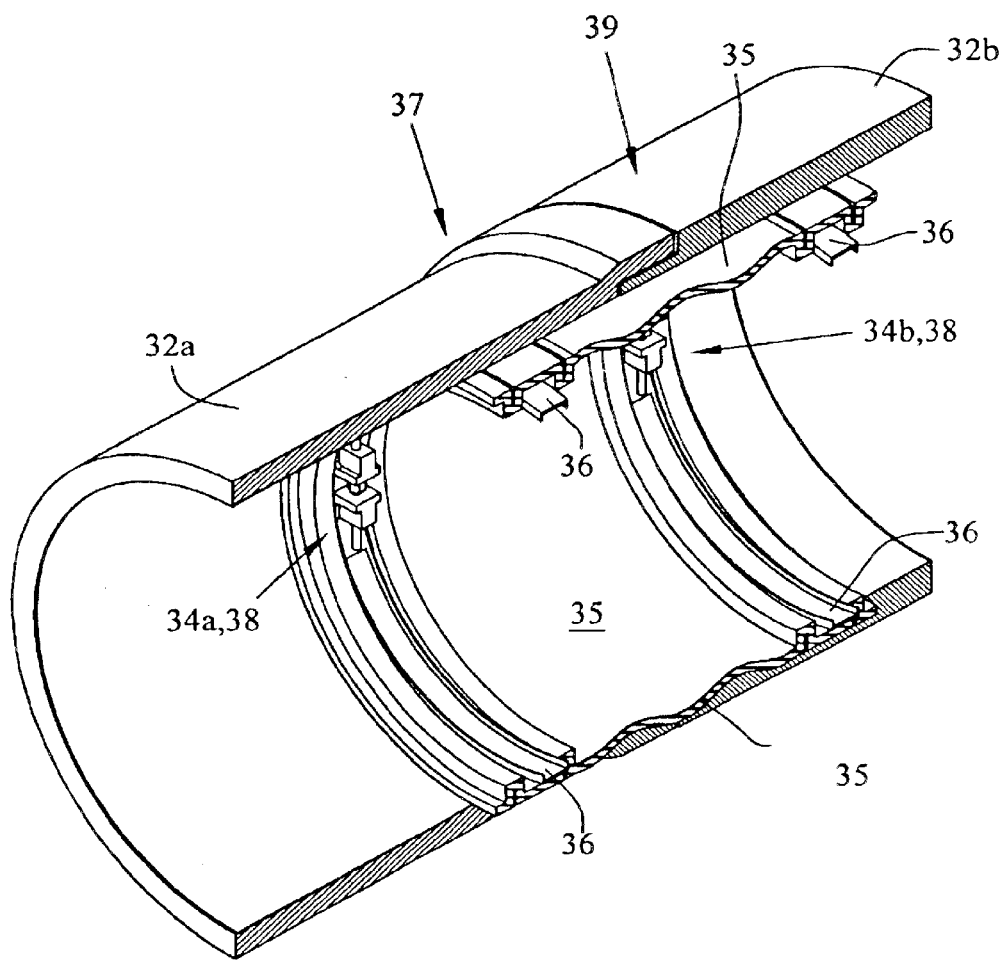
FIG. 1C is a partially exploded view of a pipe-to-pipe connection which includes an internal pipe coupler therebetween, the internal pipe coupler including a pair of expansion ring assemblies according to the present invention to prevent water infiltration into the pipes.

In FIG. 1C, a pair of expansion ring assemblies 34a and 34b are used with an internal coupling gasket 35 for sealing a connection between the female or bell end 37 of a first pipe 32a and the male or spigot end 39 of a second pipe 32b. Specifically, a first expansion ring mechanism 34a presses one end of gasket 35 into sealing engagement with bell end 37 of pipe 32a, and a second expansion ring assembly presses an opposite end of gasket 35 into sealing engagement with spigot end 39 of pipe 32b to prevent water infiltration into the pipes if or when the primary bell-spigot connection between pipes 32a and 32b fails. Alternatively, expansion ring assemblies 34a and 34b may be used with an internal coupling gasket 35 to bridge and seal a crack or leak disposed anywhere along a single pipe 32 within a pipeline.

Thus, expansion ring assembly 34 may be used in any application which generally involves the radial expansion of a flexible gasket into sealing engagement with a rigid structure. The details and operation of expansion ring assembly 34 are discussed below.

Figure 2:
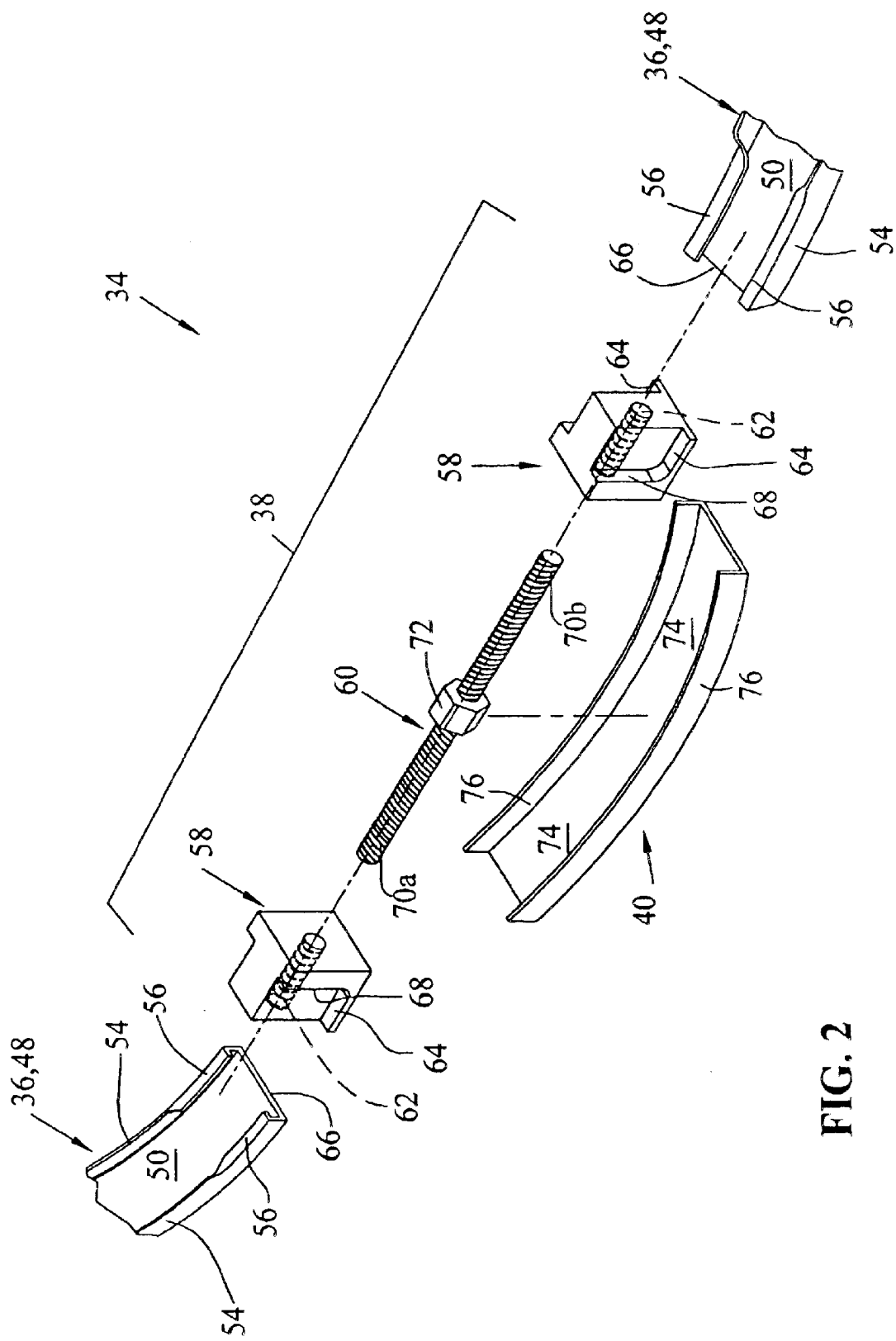
FIG. 2 is an exploded, fragmentary view of the expansion ring assembly of FIG. 1A, showing the expansion ring ends, the drive mechanism, and the oversleeve.

Referring to FIG. 2, a first embodiment of expansion ring assembly 34 is shown. Expansion ring 36 is made of a continuous strip of material, such as stainless steel, other metals, or a plastic, for example, and includes opposite ends 48. Expansion ring 36 includes a generally planar base wall 50 having outer surface 52 (FIG. 1A) for engaging the interior surface of a gasket, and side walls 54 projecting inwardly from base wall 50. Base wall 50 and side walls 54 together define a generally U-shaped cross-sectional profile; however, the overall shape of expansion ring 36 may vary. As shown in FIG. 2, ends 48 of expansion ring include crimped portions 56.

Drive mechanism 38 generally includes a pair of block members 58 and bolt 60. Block members 58 each include threaded bore 62 and a pair of shoulders 64 on opposite sides thereof. The bores 62 of a pair of block members 58 of each drive mechanism 38 are oppositely threaded, for reasons discussed below. Block members 58 are removably attached to respective ends 48 of expansion ring 36 by sliding shoulders 64 within crimped portions 56 of ends 48 of expansion ring 36 until front edges 66 of expansion ring ends 48 abut ledges 68 of block members 58. The foregoing connection configuration between block members 58 and ends 48 of expansion ring 36 is exemplary, it being understood that many other types of configurations for removably connecting block members 58 to ends 48 of expansion ring 36 may be devised, as discussed below.

Bolt 60 includes oppositely-threaded ends 70a and 70b; for example, end 70a has right-hand threads and end 70b has left-hand threads, or vice-versa. Bolt 60 additionally includes a suitable tool-receiving fitting between bolt ends 70a and 70b, such as hexagonal nut portion 72 integrally formed with bolt 60. Although nut portion 72 is shown herein as having a hexagonal configuration, i.e., having six sides, other shapes for nut portion are possible, wherein nut portion may have four, five, six, or more sides, for example. Bolt ends 70a and 70b are threadingly engaged within the corresponding threaded bores 62 of block members 58 to connect block members 58 to bolt 60.

Oversleeve 40 is formed of a segmented strip of material, such as stainless steel, other metals, or a plastic. Similar to expansion ring 36, oversleeve 40 includes base wall 74 and a pair of side walls 76 extending therefrom to define a U-shaped cross-sectional profile complementary to that of expansion ring 36, as described above. The distance between side walls 76 of oversleeve 40 is slightly wider than the corresponding distance between side walls 54 of expansion ring 36, such that ends of 48 expansion ring 36 may nest within oversleeve 40 between side walls 76 of oversleeve 40, as shown in FIG. 3.

Figure 3:
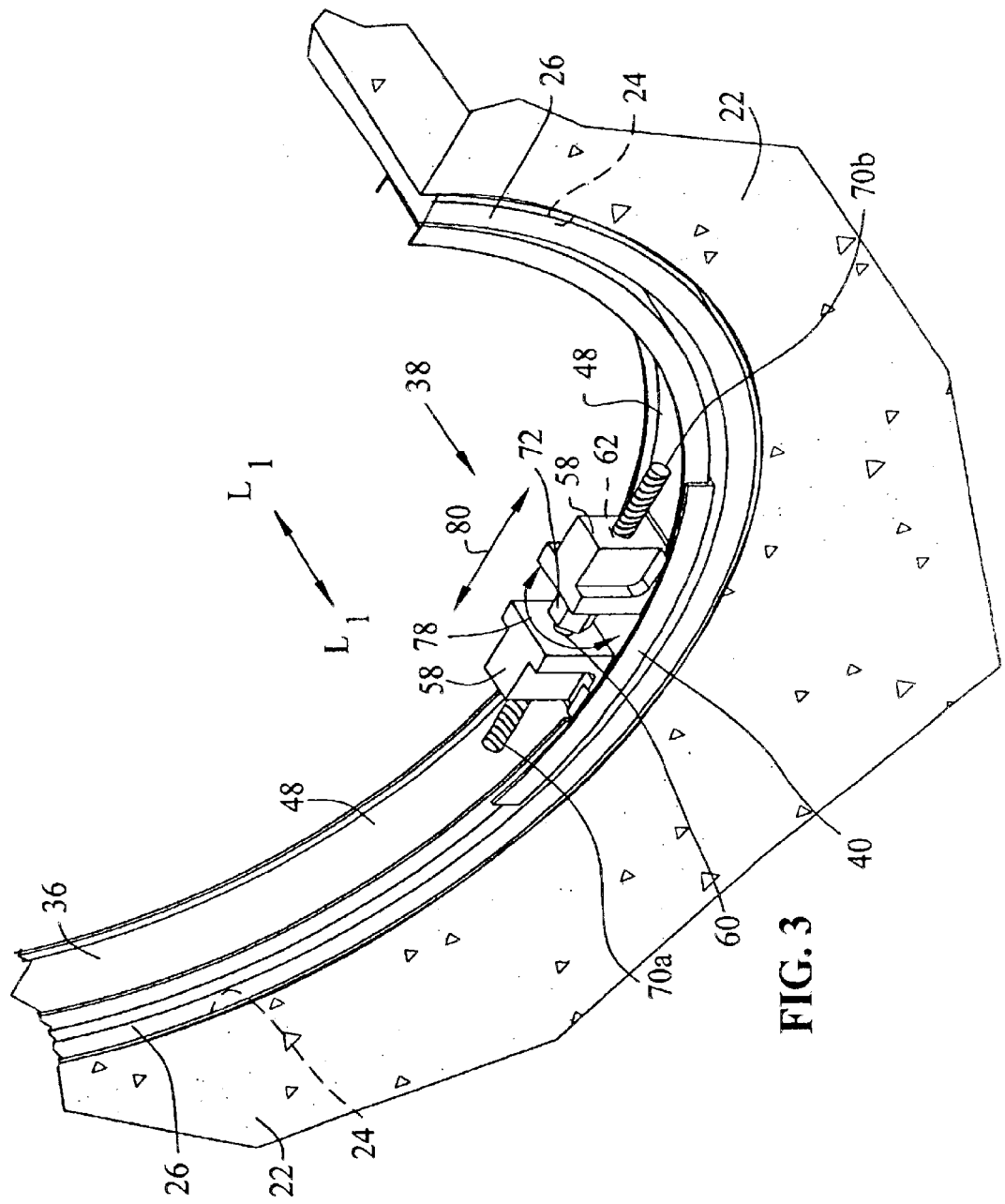
FIG. 3 is a fragmentary perspective view of the pipe connection of FIG. 1A, showing the actuation of the drive mechanism to expand the expansion ring.

Referring to FIG. 3, gasket 26 is shown disposed within opening 24 in wall 22, and expansion ring assembly 34 is shown fitted within the interior of gasket 26. Block members 58 of drive mechanism 38 are received within respective ends 48 of expansion ring 36, and ends 48 of expansion ring 36 are nested within oversleeve 40, which overlaps ends 48 of expansion ring 36 and spans the gap therebetween which is bridged by drive mechanism 38. Drive mechanism 38 is oriented such that bolt 60 is disposed perpendicular to longitudinal axis $L_1$—$L_1$ (FIGS. 1A and 3) which axis is common to expansion ring 36, gasket 26, and opening 24. A suitable tool, such as an open-end wrench or a torque wrench, for example, is engaged with nut portion 72 of bolt 60 and used to rotate bolt 60 in a first direction as illustrated by arrow 78. Upon rotation of bolt 60, the threaded engagement between bolt ends 70a and 70b and threaded bores 62 of block members 58 drives block members 58 simultaneously away from one another along bolt 60, thereby forcing ends 48 of expansion ring 36 apart from one another to expand the diameter of expansion ring 36.

During such expansion, oversleeve 40 prevents relative lateral movement between ends 48 of expansion ring 36, such that ends 48 of expansion ring 36 are constrained to move apart from one another only along the direction indicated by arrow 80. The expansion of expansion ring 36 compresses gasket 26 between expansion ring 36 and opening 24 in wall 22 to provide a fluid tight seal between gasket 26 and wall 22. Bolt 60 may also be rotated in a second direction opposite the first direction along arrow 78 if needed, which simultaneously drives block members 58 toward one another along bolt 60, thereby allowing expansion ring 36 to contract. In this manner, expansion ring assembly 34 may be removed after installation if necessary, in order to reposition expansion ring assembly 34 or alternatively, to re-use expansion ring assembly 34 in another installation or application.

Advantageously, the threaded engagement between the oppositely-threaded ends 70a and 70b of bolt 60 and block members 58 simultaneously drives block members 58 apart from one another along bolt 60 such that only a single tool need be used to actuate drive mechanism 38. A single turn of a wrench, for example, drives both block members 58 apart from one another simultaneously, such that block members 58 need not be separately adjusted. Thus, the simultaneous use of multiple wrenches, as well as multiple manual adjustment steps, is avoided. Additionally, the threaded engagement between bolt ends 70a and 70b and block members 58 allows an infinitely variable degree of adjustment of drive mechanism 38, such that expansion ring 36 may be selectively expanded to any desired extent. In this manner, expansion ring assembly 34 can accommodate gaskets 26 of varying nominal sizes, and further, can also accommodate irregularities or size variations between gaskets 26 of the same nominal size.

Figure 4:
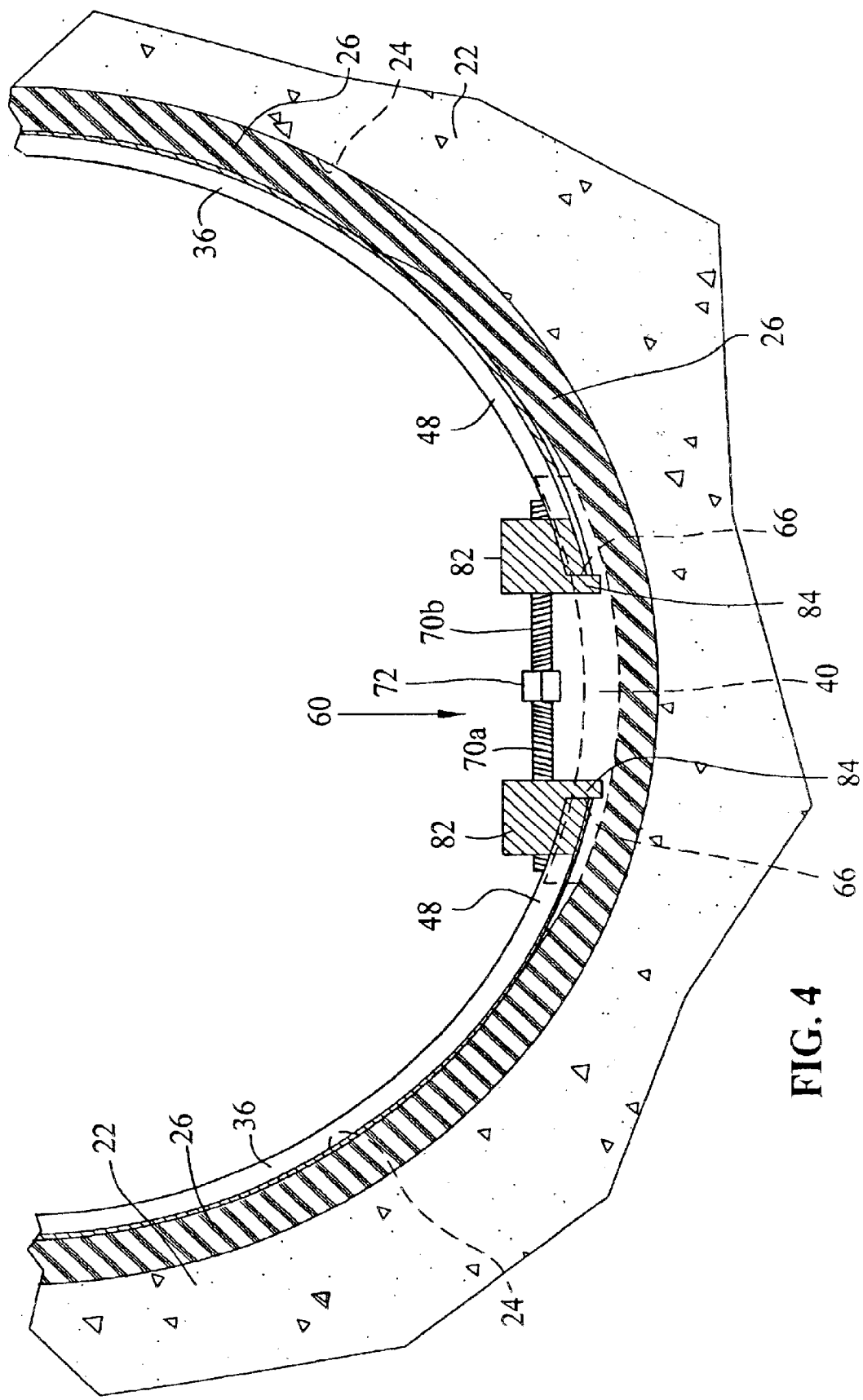
FIG. 4 is a fragmentary elevational view of a gasket within an opening in the wall of a concrete structure, showing an expansion ring assembly according to an alternative embodiment.

Referring to FIGS. 4–6B, several alternative embodiments of drive mechanism 38 are shown. Referring first to FIG. 4, block members 82 are similar to block members 58 shown in FIGS. 1A–3, and include foot portions 84 extending therefrom. Foot portions 84 are in abutment with front edges 66 of ends 48 of expansion ring 36 such that, as bolt 60 is rotated, foot portions 84 of block members 82 drive ends 48 of expansion ring 36 apart from one another to radially expand expansion ring 36. Additionally, oversleeve 40 is provided for receiving ends 48 of expansion ring 36 and to prevent relative lateral movement between ends 48 during the radial expansion of expansion ring 36, as described above.

Referring to FIG. 5, block members 86 are also similar to block members 58 shown in FIGS. 1A–3, and include projections 88 extending therefrom which define notches 90 in which ends 48 of expansion ring 36 are received such that, as bolt 60 is rotated, projections 88 drive ends 48 of expansion ring 36 apart from one another to radially expand expansion ring 36. Additionally, oversleeve 40 is provided for receiving ends 48 of expansion ring 36 and to prevent relative lateral movement between ends 48 during the radial expansion of expansion ring 36, as described above.

Figure 6A:
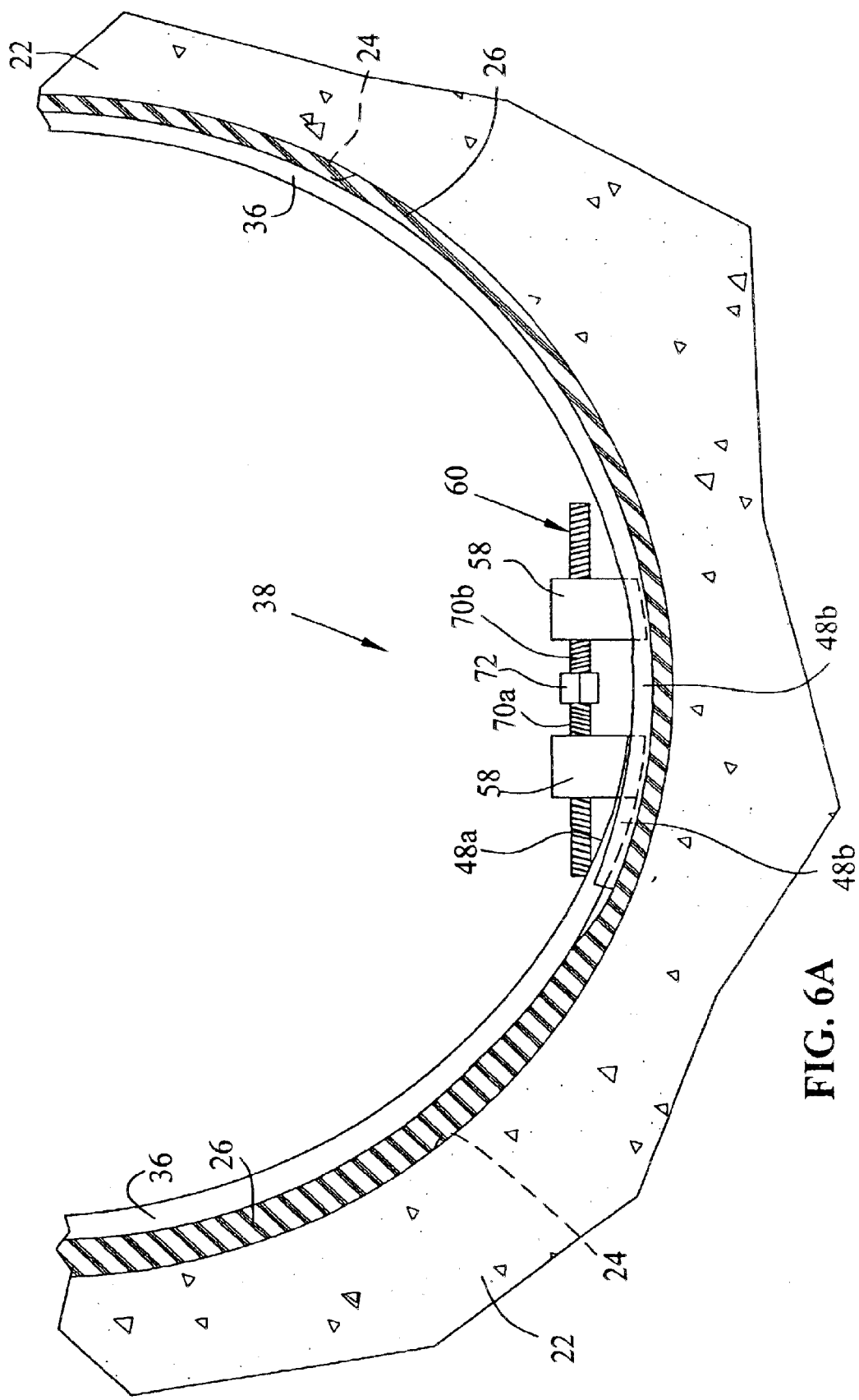
FIG. 6A is a fragmentary elevational view of a gasket within an opening in the wall of a concrete structure, showing an expansion ring assembly according to a further alternative embodiment.
Figure 6B:
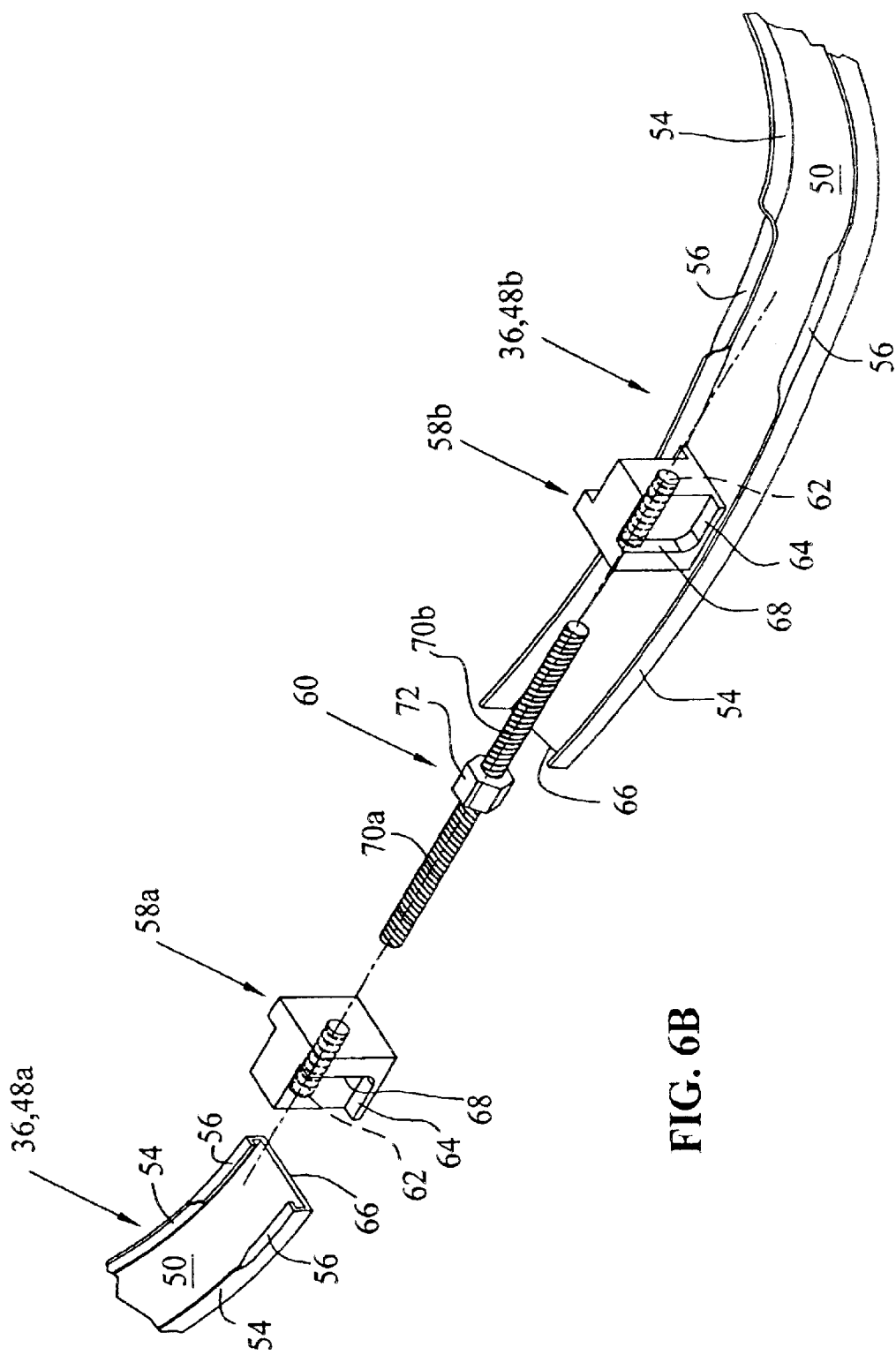
FIG. 6B is an exploded, fragmentary view of the expansion ring assembly of FIG. 6A, showing the expansion ring ends and the drive mechanism.

Referring to FIGS. 6A and 6B, ends 48 of expansion ring 36 may overlap one another, with a first end 48a nested within, and slidable with respect to, a second end 48b. Otherwise, the overall shape and cross-sectional profile of expansion ring 36 is the same as that shown in FIGS. 1A–3. Drive mechanism 38 includes a first block member 58a attached to first end 48a of expansion ring 36, and second block member 58b attached to second end 48b of expansion ring 36. Referring to FIG. 6b, block member 58a is attached to end 48a of expansion ring 36 by sliding shoulders 64 within crimped portion 56 of end 48a until front edge 66 of end 48a abuts ledges 68 of block member 58a. Block member 58b is attached to crimped portion 56 of end 48b in the same manner; however, crimped portion 56 of end 48b is disposed inwardly of front edge 66 a suitable distance to allow overlap between ends 48a and 48b of expansion ring 36. Alternatively, block member 58b may be attached to end 48b in another suitable manner, such as with one or more fasteners, or end 48b may be formed with a tab projecting from the base wall 50 thereof which is drivingly engaged by block member 58b.

Referring to FIG. 6A, rotation of bolt 60 of drive mechanism 38 simultaneously drives block members 58a, 58b away from one another as described above to radially expand expansion ring 36, wherein during such expansion, first end 48a is slidable with respect to second end 48b. The nesting engagement between first end 48a and second end 48b prevents relative lateral movement therebetween during the expansion of expansion ring 36, such that oversleeve 40 is not needed with the embodiment of expansion ring shown in FIGS. 6A and 6B, in which ends 48a and 48b overlap one another.

Figure 10A:
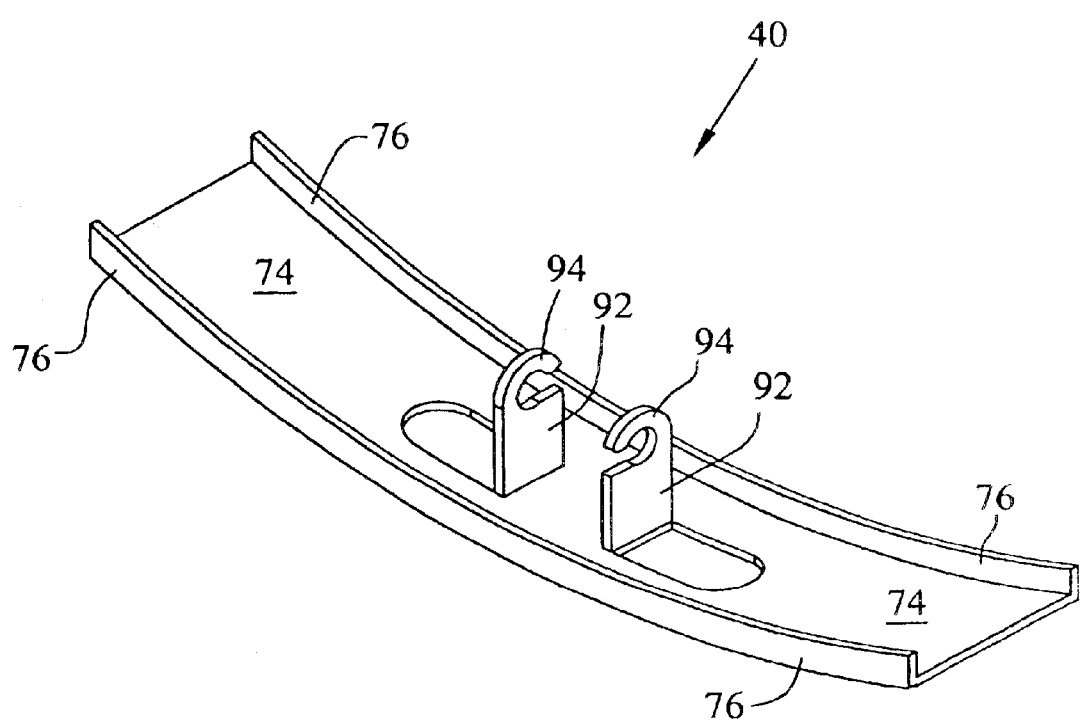
FIG. 10A is a perspective view of an oversleeve including a pair of retention members formed therein.
Figure 10B:
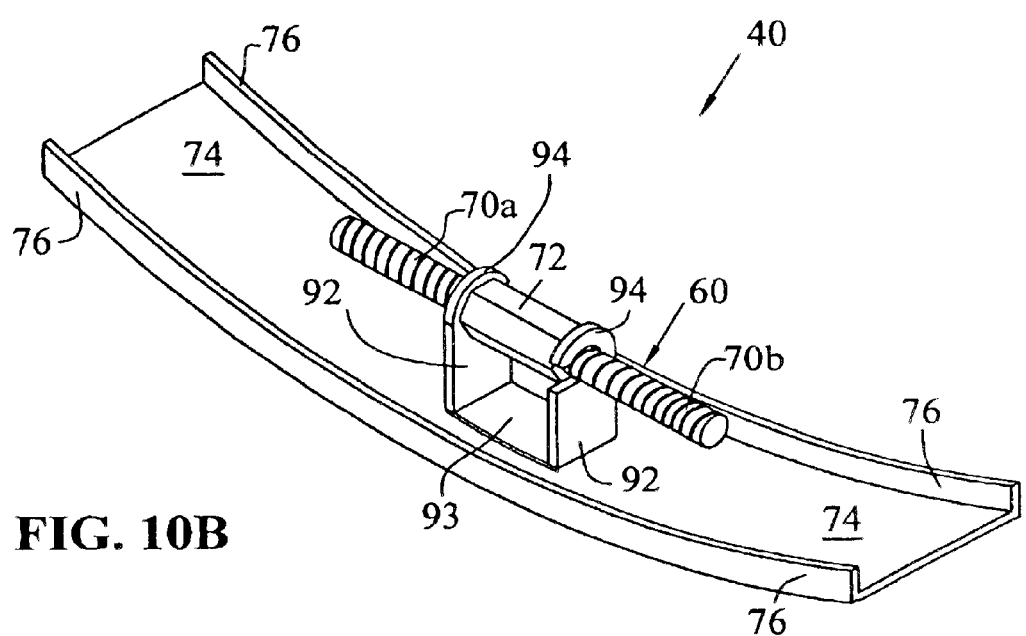
FIG. 10B is a perspective view of an oversleeve including a retention bracket welded thereto.

Referring to FIG. 10A, oversleeve 40 may optionally include a pair of retention members 92 extending therefrom. Retention members 92 may be initially punch-formed in base wall 74 of oversleeve 40, followed by bending retention members 92 outwardly from base wall 74 such that retention members 92 extend generally perpendicular to base wall 74. Alternatively, as shown in FIG. 10B, retention members 92 may comprise portions of a separate, U-shaped bracket 93 which is attached to oversleeve 40 by welding, for example. Retention members 92 include hooks 94 therein which, as shown in FIG. 11, receive ends 70a and 70b of bolt 60 therethrough to secure oversleeve 40 to drive mechanism 38.

The foregoing connection between oversleeve 40 and bolt 60 which is provided by retention members 92 is especially advantageous when drive mechanism 38 is located at a 12 o'clock position, for example, with respect to opening 24 in wall 22 in order to prevent drive mechanism 38 from disengaging by gravity from expansion ring 36 before drive mechanism 38 is actuated to expand expansion ring 36 in the manner described above. Thus, regardless of the circumferential position of ends 48 of expansion ring 36 and drive mechanism 38 with respect to opening 24 in wall 22, drive mechanism 38 is retained in position before same is actuated to expand expansion ring 36.

Figure 10C:
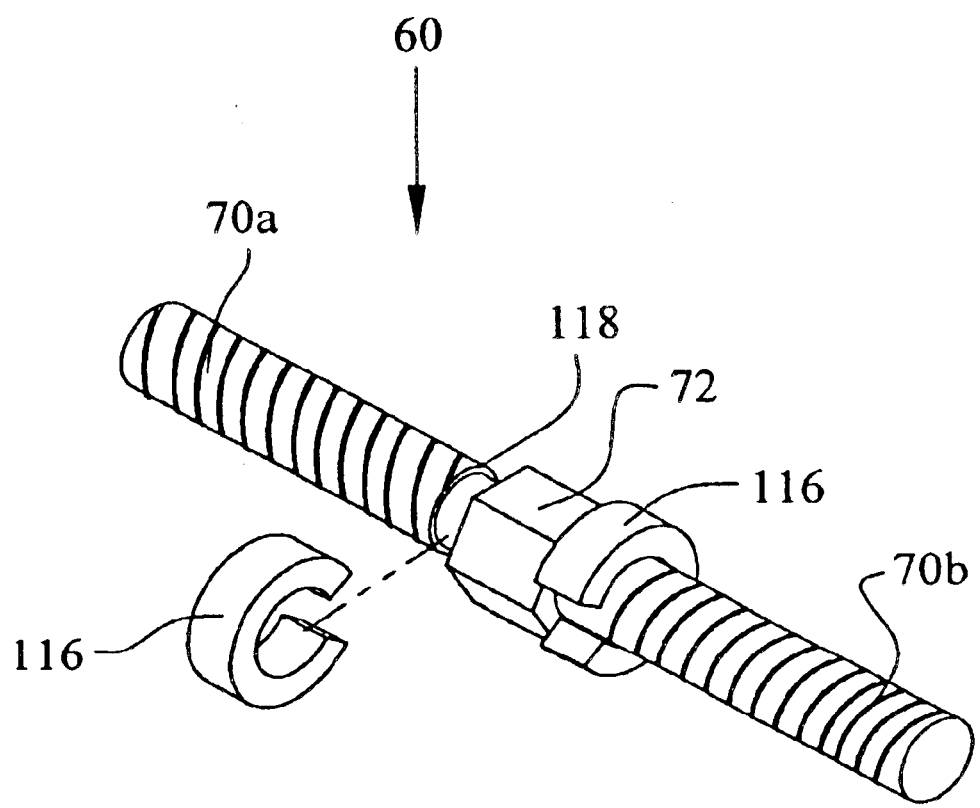
FIG. 10C is a perspective view of a bolt having a pair of C-rings attached thereto at respective sides of the nut portion.
Figure 11:
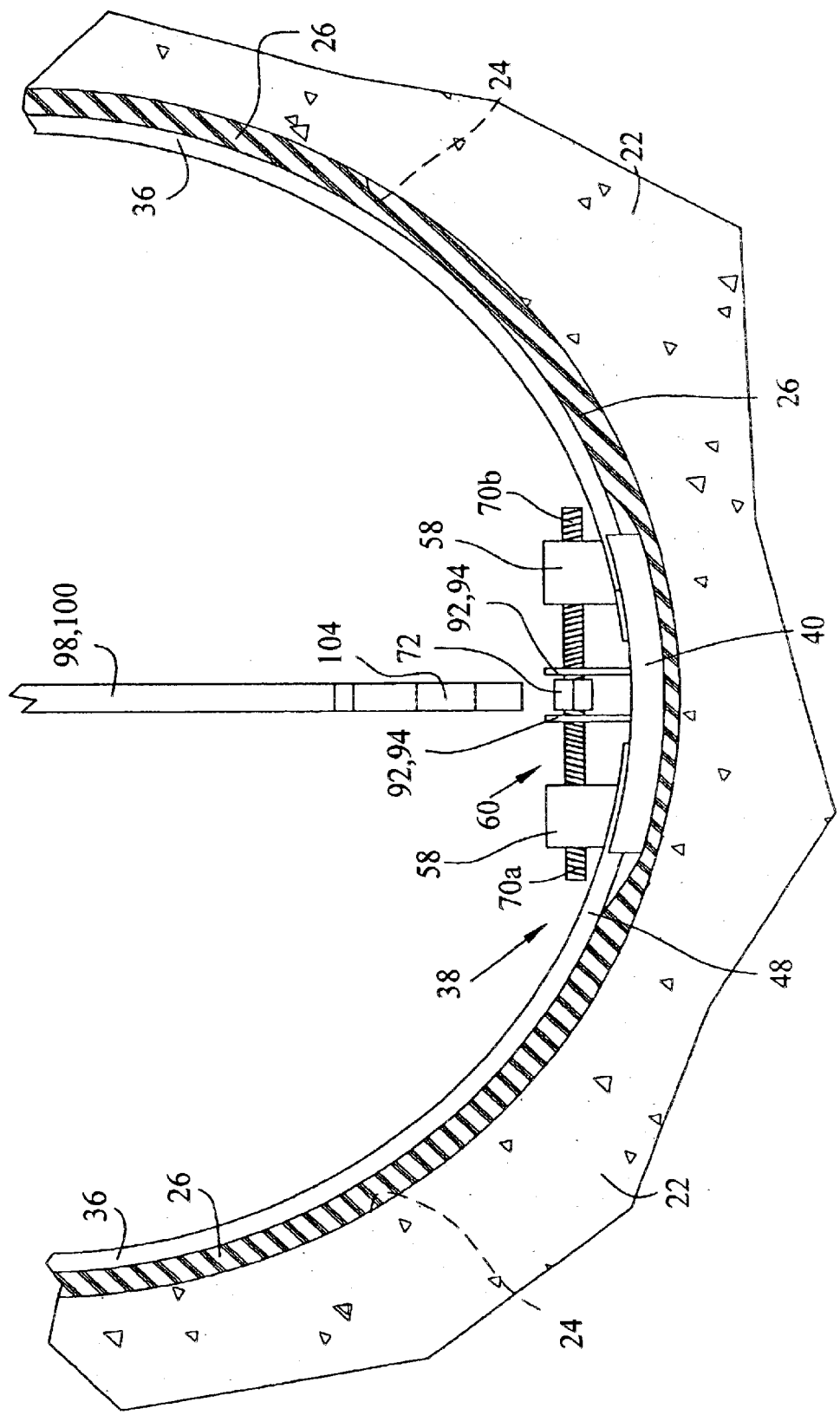
FIG. 11 is a fragmentary elevational view of a gasket within an opening in the wall of a concrete structure, showing a drive mechanism including the oversleeve of FIG. 10A, and further showing the engagement of a tool with the nut portion of the bolt of the drive mechanism.

Referring to FIG. 11, retention members 92 of oversleeve 40 may advantageously be positioned closely adjacent opposite sides of nut portion 72 of bolt 60. Thus, when a tool such as wrench 98 or 100 is engaged with nut portion 72 to rotate bolt 60, the tool is retained on nut portion 72, preventing the tool from laterally disengaging, or slipping off of, nut portion 72. Similarly, as shown in FIG. 10C, bolt 60 may include a pair of C-rings 116 attached thereto on opposite sides of nut portion 72, which extend beyond the outer periphery of nut portion 72 and prevent lateral separation of a tool from nut portion 72. C-rings 116 may be fitted directly to bolt 60 or, as shown in FIG. 10C, may be fitted within grooves 118 of bolt 60 which are disposed on opposite sides of nut portion 72.

Figure 14:
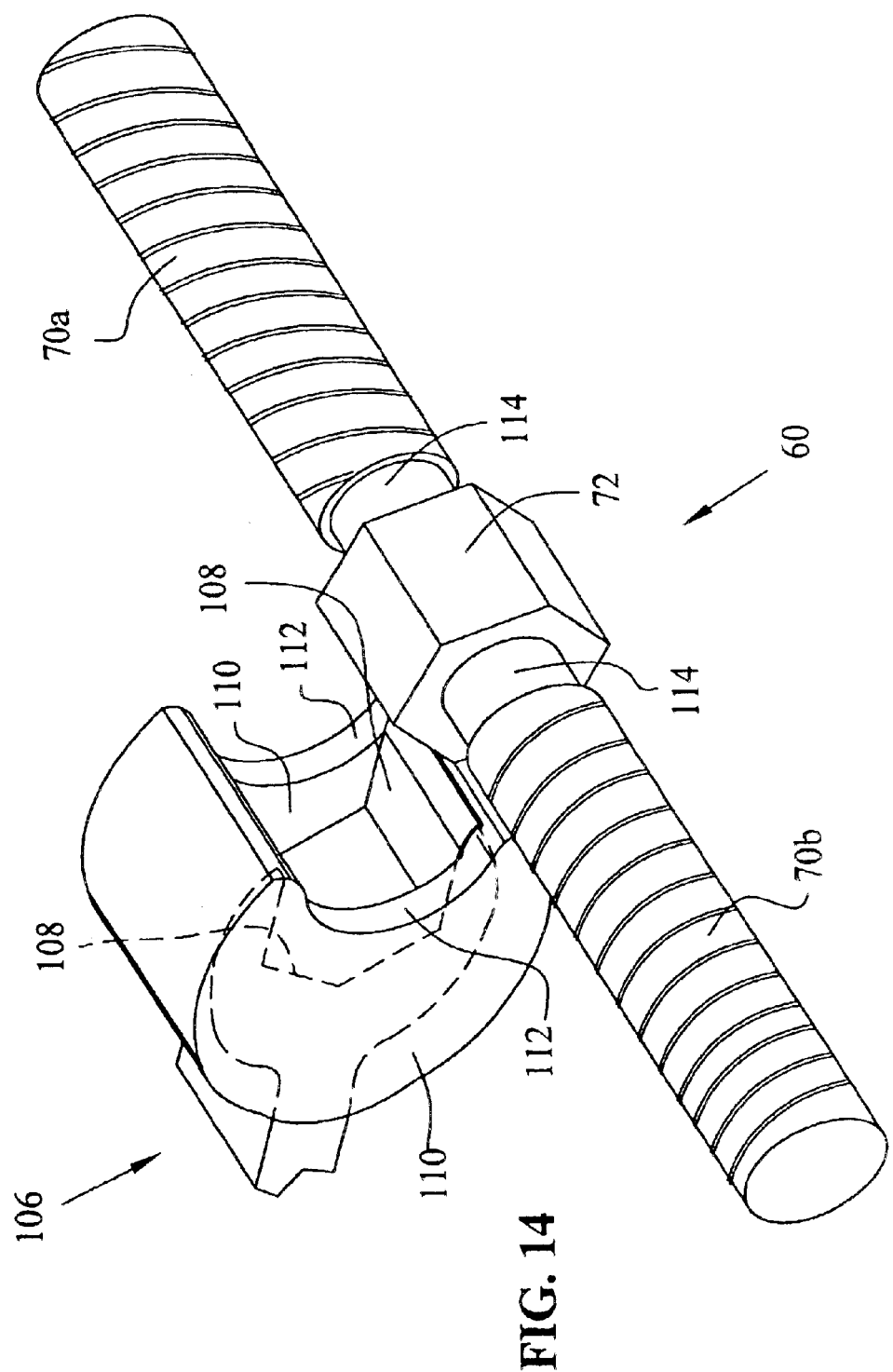
FIG. 14 is a perspective view of a wrench according to the present invention, the wrench including a pair of retention plates for abutting the ends of the nut portion of the bolt of a drive mechanism.

Referring to FIG. 14, wrench 106 is shown, which includes a conventionally-shaped socket end 108 configured to engage nut portion 72 of bolt 60. Wrench 106 may be a standard open-end wrench or alternatively, a torque wrench with a disengagement clutch which may be set to a specified torque rating. Further, socket end 108 may include a transverse notch (not shown) within socket end 108 as is known, to enable ratcheting movement of socket end 108 of wrench 106 about nut portion 72, such that socket end 108 of wrench 106 need not be completely disengaged from nut portion 72 between wrench turns. According to the present invention, socket end 108 additionally includes a pair of retention plates 110 attached to opposite sides thereof. Retention plates 110 include curved edges 112 which project beyond the socket profile of socket end 108 and abut the opposite ends of nut portion 72 to prevent lateral separation of socket portion 108 of wrench 106 from nut portion 72 during and in between wrench turns. During rotation of nut portion 72, curved edges 112 engage annular smooth surfaces 114 of bolt 60 which are disposed on opposite sides of nut portion 72. Wrench 106 is particularly useful for engaging nut portion 72 to rotate bolt 60 when drive mechanism 38 is disposed within a small clearance space, as shown in FIG. 7.

Figure 12:
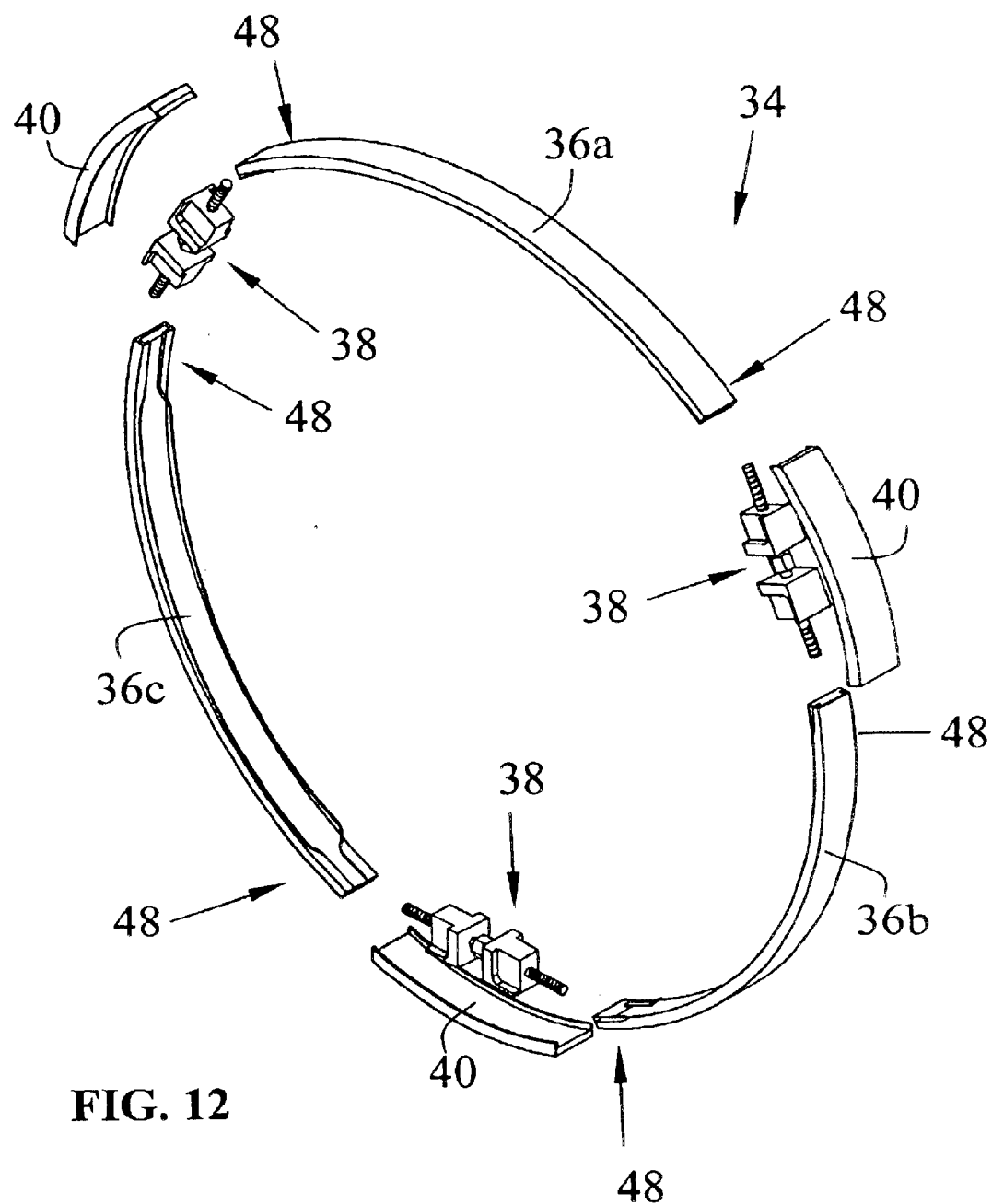
FIG. 12 is a perspective, exploded view of an expansion ring assembly in accordance with yet another alternative embodiment.

Referring to FIG. 12, a further embodiment of expansion ring assembly 34 is shown, wherein expansion ring 36 is formed from a plurality of individual ring segments 36a, 36b, and 36c, each of which may have the same overall cross-sectional profile and configuration as shown in FIGS. 1A–3 and described above. Each ring segment 36a, 36b, and 36c includes opposite ends 48, and a drive mechanism 38 installed between each pair of adjacent ends 48 of ring segments 36a, 36b, and 36c. In addition, oversleeves 40 may overlap and receive adjacent ends 48 of ring segments 36a, 36b, and 36c, as described above, to prevent relative lateral movement between ends 48 as expansion ring 36 is expanded. When the expansion ring assembly of FIG. 12 is installed within a gasket in an opening in the wall of the concrete structure, each drive mechanism 38 may be actuated in the manner described above to radially expand adjacent ring segments 36a, 36b, and 36c. Notably, the expansion ring assembly shown in FIG. 12 is particularly useful with gaskets having large diameters, and additionally, the multiple drive mechanisms provide greater variability to the radial dimensions of expansion ring 36, which aids in compensating for irregularities in gasket 26 or opening 24 in wall 22 of a structure. For example, if gasket 26 needs to be sealingly compressed to a greater extent at a certain location along its circumference, the drive mechanism(s) 38 most closely adjacent that section of gasket 26 may be actuated to expand ring segments 36a, 36b, and 36c to further compress that section of gasket 26 and enhance the seal.

Figure 7:
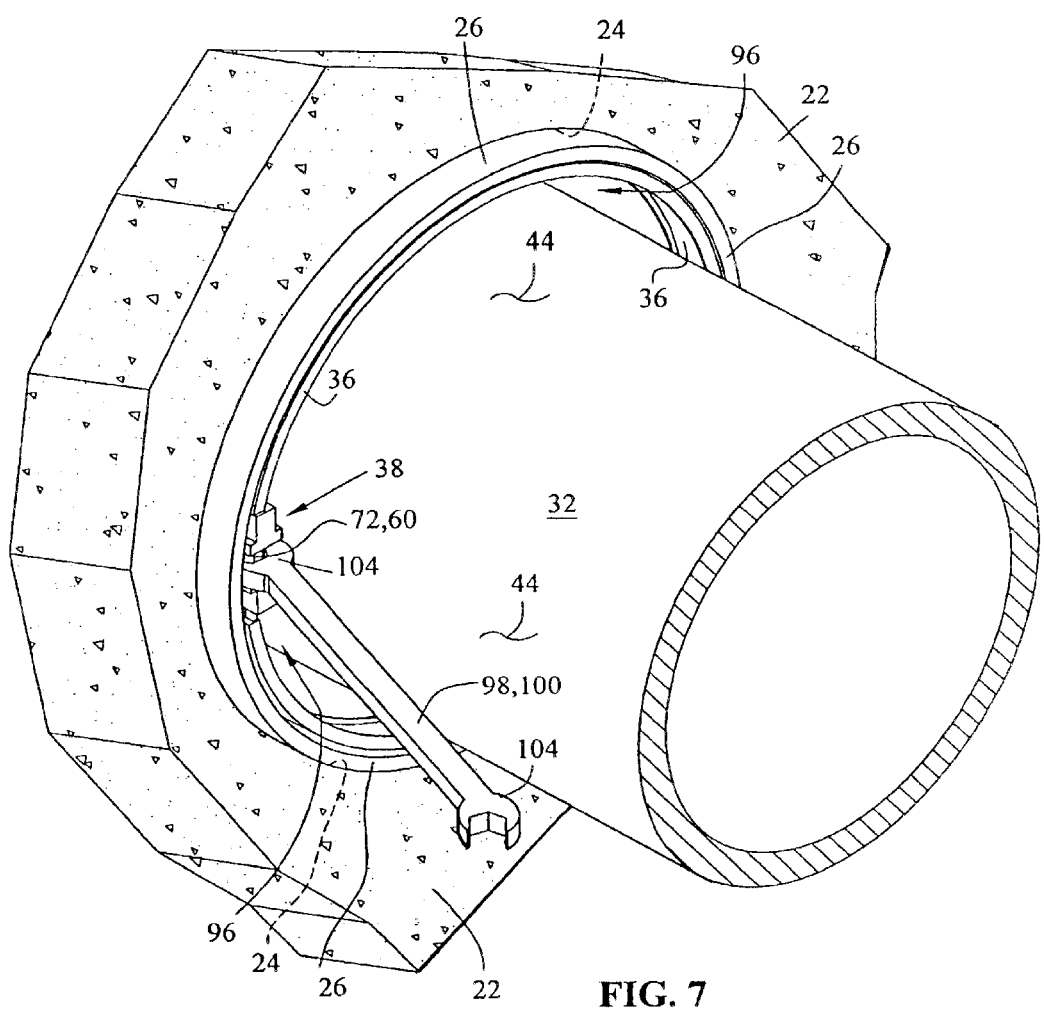
FIG. 7 is a perspective view of a connection between a pipe and an opening in the wall of a concrete structure, showing a tool engaged with the drive mechanism of the expansion ring.

Referring to FIG. 7, pipe 32 is shown connected to opening 24 in wall 22 of a structure with an expansion ring assembly according to the present invention. After pipe 32 is connected to gasket 26 and the structure, it might be necessary in the course of maintenance to tighten drive mechanism 38 to further expand expansion ring 36 to enhance the compressive seal of gasket 26. As shown in FIG. 7, a clearance space 96 exists between expansion ring 36 and outer surface 44 of pipe 32 in which drive mechanism 38 is disposed. Depending upon the diameter of pipe 32 and/or other factors, clearance space 96 may be a very narrow space, such that nut portion 72 of bolt 60 of drive mechanism 38 is not easily accessible by a tool.

Figure 8:
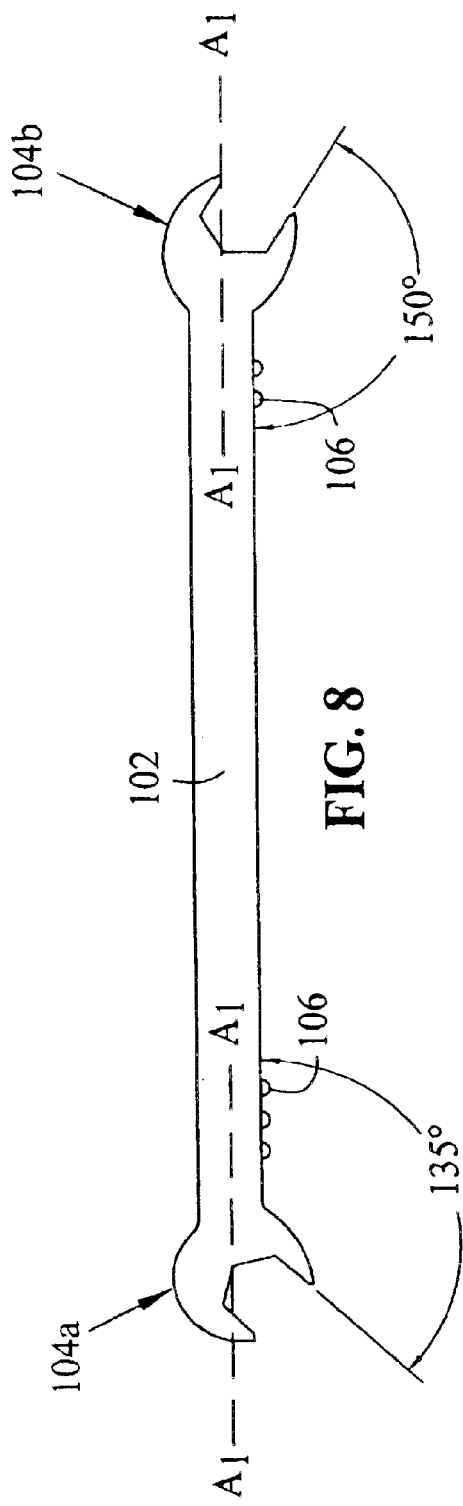
FIG. 8 is an elevational view of a first wrench useful to actuate the drive mechanism of the expansion ring FIG. 7.
Figure 9:
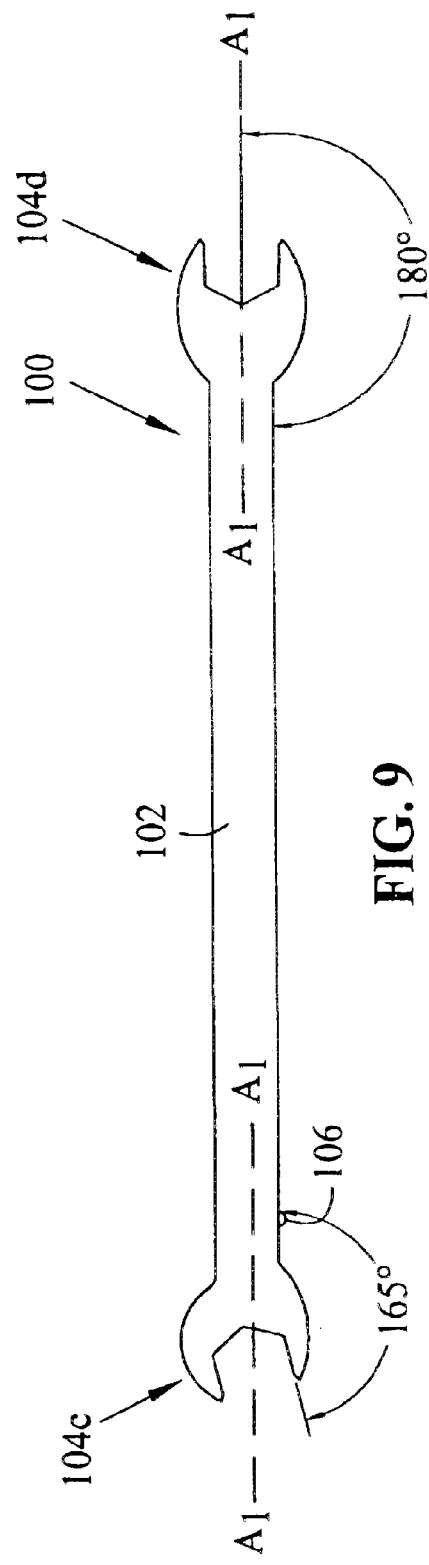
FIG. 9 is an elevational view of a second wrench useful to actuate the drive mechanism of the expansion ring FIG. 7.

In FIGS. 8 and 9, specially designed wrenches 98 and 100 are shown for engaging nut portion 72 of bolt 60 of drive mechanism 38 when same is within a small clearance space 96 between expansion ring 36 and pipe 32. Each wrench 98 and 100 includes shank 102 having a longitudinal axis $A_1$—$A_1$, and a pair of opposing open socket ends 104. Socket ends 104 are shaped such that the angular orientation of same varies with respect to the longitudinal axis $A_1$–$A_1$ of shanks 102 in a progression of 15° increments. Specifically, socket ends 104 include 135° socket end 104a of wrench 98, 150° socket end 104b of wrench 98, 165° socket end 104c of wrench 100, and 180° socket end 104c of wrench 100. The foregoing progression of the varying angular orientation of socket ends 104 may be indicated on wrenches 98 and 100 by raised bumps 106 to provide a user with a tactile indication as to which socket head 104 is being used. The varying angular orientation of socket ends 104 allows a suitable socket end 104 to be engaged with nut portion 72 of bolt 60 of drive mechanism 38 in clearance space 96 regardless of the rotational position of nut portion 72. In this manner, as shown in FIG. 7, a suitable socket end 104 may be engaged with nut portion 72 within a very small clearance space 96, followed by turning wrench 98 or 100 through a small angle to rotate nut portion 72 through ⅛ of a turn, for example, to expand expansion ring 36. Then, different socket ends 104a–d of wrenches 98 and 100 may be sequentially used as needed to continue to rotate nut portion 72 until expansion ring 36 is radially expanded to compress gasket 26 to a desired extent into sealing engagement with opening 24 in wall 22.

Figure 13:
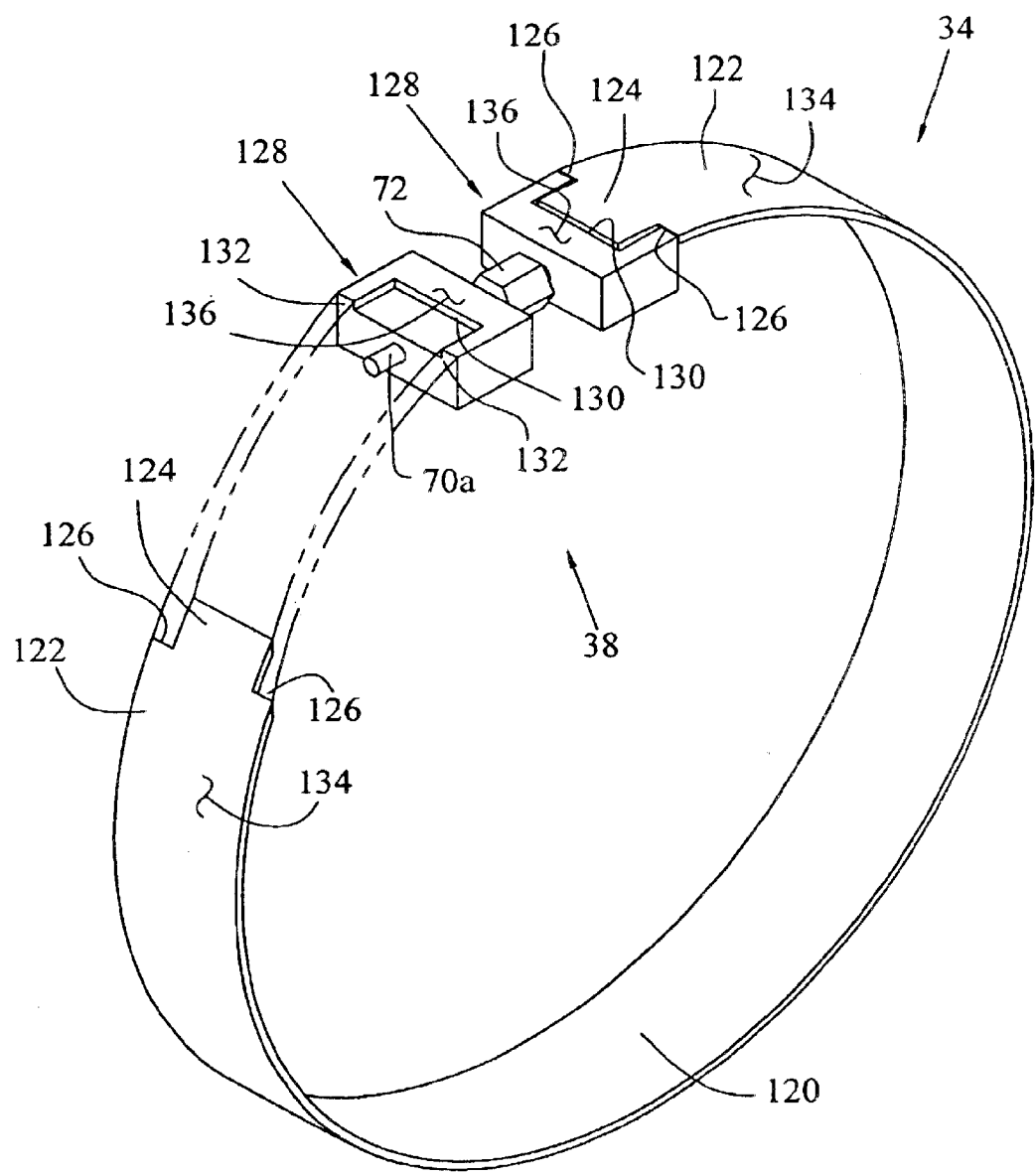
FIG. 13 is a perspective view of an expansion ring assembly in accordance with a further embodiment.

Referring to FIG. 13, an additional embodiment of expansion ring assembly 34 is shown. Expansion ring 120 is formed from a continuous strip of a flat material, such as stainless steel, for example, and includes ends 122 formed with tabs 124 and shoulders 126. Drive mechanism 38 includes bolt 60 having nut portion 72 and block members 128 including recesses 130 and front edges 132. To engage block members 128 with ends 122 of expansion ring 120, tabs 124 of ends 122 are received within recesses 130 of block members 128, with front edges 132 of block members 128 contacting shoulders 126 of ends 122. As may be seen in FIG. 13, in the foregoing arrangement, outer surface 134 of expansion ring 120 at ends 122 thereof is substantially flush with bottom surfaces 136 of block members 128.

The expansion ring assembly of FIG. 13 functions to expand gasket 26 in the same general manner as described above regarding previous embodiments. However, the engagement of tabs 124 of ends 122 of expansion ring 120 within recesses 130 of block members 128 prevents lateral movement between ends 122, such that an oversleeve 40 is not needed with the drive mechanism 38 of FIG. 13. Optionally, an oversleeve 40 may be used with the drive mechanism 38 if desired, wherein outer surface 134 of expansion ring 120 slidingly contacts base wall 74 of oversleeve 40 as block members 128 are driven apart.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A expansion ring assembly for sealing gasket to an annular wall, said assembly comprising:
    a ring defining a pair of end portions; and
    a drive mechanism disposed substantially within said ring, comprising;
        a pair of block members each having a threaded bore therethrough, said block members removably engaged with respective end portions of said ring; and
        a bolt including oppositely-threaded ends respectively threaded within said bores of said block members, wherein rotation of said bolt in a first direction causes said block members to be simultaneously driven apart from one another to thereby expand said ring.

2. The expansion ring assembly of claim 1, wherein said ring includes a longitudinal axis, said bolt disposed perpendicular to said longitudinal axis.

3. The expansion ring assembly of claim 1, wherein said ring includes an outer surface, and wherein at least a portion of said outer surface is planar.

4. The expansion ring assembly of claim 1, wherein said end portions of said ring define an opening in said ring therebetween, said opening spanned by said drive mechanism.

5. The expansion ring assembly of claim 1, wherein said end portions of said ring overlap one another.

6. The expansion ring assembly of claim 1, wherein said bolt includes tool-receiving structure disposed intermediate said oppositely-threaded ends, said tool-receiving structure engagable by a tool to rotate said bolt.

7. The expansion ring assembly of claim 1, wherein said end portions of said ring are crimped, and said block members each include shoulder portions engaging said crimped end portions of said ring.

8. The expansion ring assembly of claim 1, wherein said block members each include hooks defining slots, said end portions of said ring engaged within said slots.

9. The expansion ring assembly of claim 1, further comprising an oversleeve having a substantially U-shaped cross section, said oversleeve overlapping said end portions of said ring to prevent lateral movement of said end portions with respect to one another.

10. The expansion ring assembly of claim 9, wherein said oversleeve includes a pair of retention members having apertures through which said bolt is disposed, said retention members respectively located closely adjacent opposite sides of said tool-receiving structure.

11. The expansion ring assembly of claim 1, wherein said ring includes a planar web portion having an outer surface and pair of side walls depending interiorly therefrom, said web portion and said side walls defining a U-shaped cross section.

12. The expansion ring assembly of claim 1, wherein said ring is formed of a flat segment having end portions with tabs, said tabs fitting within recesses in said block members to removably attach said block members to said end portions.

13. The expansion ring assembly of claim 1, wherein said ring is formed of more than one segment, each connection between adjacent segments provided by a said drive mechanism.

14. In combination:
    a structure having an annular wall;
    a flexible, substantially annular gasket received within said annular wall; and
    an expansion ring assembly received within said gasket, said expansion ring assembly comprising:
        a ring defining a pair of end portions; and
        a drive mechanism disposed substantially within said ring, said drive mechanism including a pair of block members each having a threaded bore therethrough, said block members respectively removably engaging said end portions of said ring, and a bolt including oppositely-threaded ends respectively threaded within said bores of said block members, wherein rotation of said bolt in a first direction causes said block members to be simultaneously driven away from one another to thereby expand said ring and compress said gasket into sealing engagement with said annular wall.

15. The combination of claim 14, wherein said gasket includes a first portion into which said expansion ring assembly is received, and a second portion, said combination further comprising:
    a pipe received through said second portion of said gasket; and
    at least one clamp secured about an exterior of said second portion of said gasket, said second portion compressed between said at least one clamp and said pipe.

16. The combination of claim 14, wherein said ring includes a planar web portion having a pair of side walls depending interiorly therefrom, said web portion and said side walls defining a U-shaped cross section.

17. The combination of claim 14, wherein said end portions of said ring overlap one another.

18. The combination of claim 14, wherein said end portions of said ring define an opening therebetween said opening spanned by said driven mechanism.

19. The combination of claim 14, wherein said block members are removably attached to said end portions of said ring.

20. The combination of claim 19, wherein said ring is formed of a flat segment having end portions with tabs, said tabs fitting within recesses in said block members to removably attach said block members to said end portions.

21. The combination of claim 14, wherein said ring includes a longitudinal axis, and said bolt is disposed perpendicular to said longitudinal axis.

22. The combination of claim 14, wherein said bolt includes tool-receiving structure disposed intermediate said oppositely-threaded ends, said tool-receiving structure engagable by a tool to rotate said bolt.

23. The combination of claim 14, further comprising an oversleeve overlapping said end portions of said ring to prevent relative lateral movement of said end portions.

24. The combination of claim 23, wherein said oversleeve includes a pair of tabs respectively located closely adjacent opposite sides of said tool-receiving structure.

25. The combination of claim 14, wherein said block members each include notches into which said end portions of said ring are received.

26. The combination of claim 14, wherein said ring is formed of more than one segment, each connection between adjacent segments provided by a said drive mechanism.

27. An expansion ring assembly in combination with a gasket for outwardly radially compressing said gasket into sealing engagement with an annular wall, comprising:

a ring defined by at least two segments, each segment having pair of opposite end portions; and at least two drive mechanisms, each said drive mechanism disposed substantially within said ring and including a pair of block members each having a threaded bore therethrough, said block members respectively adjacent end portions of said ring segments; and a bolt including oppositely-threaded ends respectively removably engaging threaded within said bores of said block members, wherein rotation of said bolt in a first direction causes said block members to be driven away from one another to thereby expand said ring.

28. The expansion ring assembly of claim 27, wherein said block members are removably attached to said end portions of said ring segments.

29. The expansion ring assembly of claim 27, wherein adjacent said end portions of said ring segments define a gap therebetween, each said gap spanned by a said drive mechanism.

30. The expansion ring assembly of claim 27, further comprising an oversleeve overlapping each pair of adjacent end portions of said ring segments to prevent relative lateral movement therebetween.

31. A method of sealingly engaging a gasket with an annular wall, comprising the steps of:

placing a gasket within the annular wall;

fitting an expansion ring against an interior surface of the gasket;

engaging a tool with a bolt of a drive mechanism disposed substantially within the ring, the bolt including oppositely-threaded ends threadably engaged with lock members removably connected to opposing ends of the expansion ring; and rotating the bolt with the tool to simultaneously drive the block members apart from one another to expand the expansion ring and sealingly compress the gasket between the expansion ring and the annular wall.

32. The method of claim 31, comprising the additional steps of:

inserting a pipe through a portion of the gasket which extends from the compressed portion;

installing at least one clamp around an outer surface of the extending portion of the gasket; and tightening each clamp to sealingly compress the extending portion of the gasket between each clamp and an outer surface of the pipe.

33. The method of claim 31, wherein said engaging step comprises engaging a wrench with the bolt, the wrench selected from a plurality of wrenches having socket ends with varying angular orientations.

* * * * *

UNITED STATES PATENT AND TRADEMARK OFFICE
CERTIFICATE OF CORRECTION

PATENT NO. : 6,805,359 B2
DATED : October 19, 2004
INVENTOR(S) : Ronald W. Neuhaus et al.

It is certified that error appears in the above-identified patent and that said Letters Patent is hereby corrected as shown below:

Column 12,
Line 50, delete "driven" and insert -- drive --.

Column 13,
Line 18, after "respectively" insert -- removably engaging --.
Line 21, delete "removably engaging".

Column 14,
Line 11, delete "lock" and insert -- block --.

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,805,359 B2  Page 1 of 1
APPLICATION NO. : 10/280917
DATED : October 19, 2004
INVENTOR(S) : Ronald W. Neuhaus et al.

It is certified that error appears in the above-identified patent and that said Letters Patent is hereby corrected as shown below:

Title Page

Item [56], References Cited,

Add the following references cited by the Examiner:

| | | | |
|---|---|---|---|
| 700,704 | 5/1902 | Parker | |
| 4,715,626 | 12/1987 | Gehring et al. | 285/230 |
| 4,795,199 | 1/1989 | Gehring et al. | 285/236 |
| 5,150,927 | 9/1992 | Skinner | 285/189 |

Signed and Sealed this

Sixteenth Day of October, 2007

JON W. DUDAS
*Director of the United States Patent and Trademark Office*